UNITED STATES PATENT OFFICE.

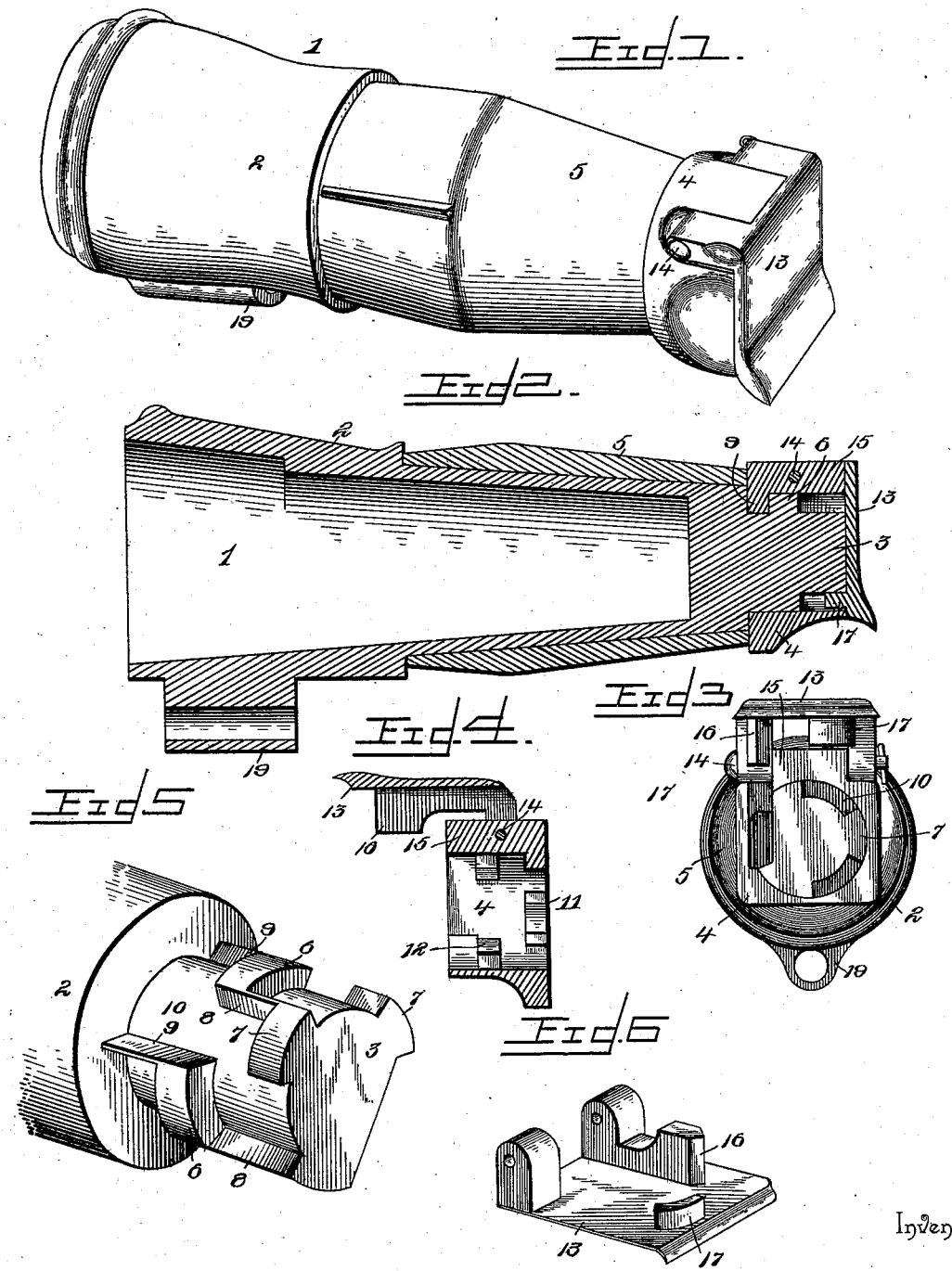

CHARLES HENRY WORNNER RELYEA, OF NORTH ADAMS, MICHIGAN, ASSIGNOR OF ONE-HALF TO A. B. BUCK, OF SAME PLACE.

HUB-ATTACHING DEVICE.

SPECIFICATION forming part of Letters Patent No. 576,892, dated February 9, 1897.

Application filed April 1, 1896. Serial No. 585,773. (No model.)

*To all whom it may concern:*

Be it known that I, CHARLES HENRY WORNNER RELYEA, a citizen of the United States, residing at North Adams, in the county of Hillsdale and State of Michigan, have invented a new and useful Locking Device for Axle-Skeins, of which the following is a specification.

The invention relates to improvements in locking devices for axle-skeins.

The object of the present invention is to improve the construction of locking devices for axle-skeins and to provide a simple, inexpensive, and efficient device capable of securely retaining an axle-nut on a skein or spindle and of absolutely preventing it from becoming accidentally lost in passing over rough roads and adapted to permit a nut to be readily removed and replaced on a spindle when desired.

The invention consists in the construction and novel combination and arrangement of parts hereinafter fully described, illustrated in the drawings, and pointed out in the claim hereto appended.

In the drawings, Figure 1 is a perspective view of an axle-skein provided with a locking device constructed in accordance with this invention. Fig. 2 is a longitudinal sectional view of the same. Fig. 3 is an end elevation, the hinged cap of the nut being raised. Fig. 4 is a sectional view of the axle-nut, the cap being raised. Fig. 5 is a detail perspective view of the outer end of the axle-skein. Fig. 6 is a detail perspective view of the cap of the axle-nut.

Like numerals of reference designate corresponding parts in all the figures of the drawings.

1 designates an axle-skein, the spindle portion 2 of which is provided at its outer end with an extension 3, receiving an axle-nut 4, and the latter is detachably interlocked with the extension 3 to secure an axle-box 5 and the wheel to which it is designed to be applied on the spindle. The extension 3 of the spindle is provided with a series of transversely-disposed inner and outer lugs 6 and 7, arranged in pairs, the outer lugs being disposed opposite the intervals of the series of inner lugs. The adjacent ends of each pair of inner and outer lugs are connected by a longitudinally-disposed flange 8 and the other end of the inner lug of each pair is connected with the spindle 2 by a longitudinally-disposed flange 9. The series of lugs and flanges form double bayonet grooves or ways 10, adapted to be engaged by inner and outer lugs 11 and 12, arranged on the interior of the axle-nut and disposed similar to the lugs of the extension 3 of the spindle, the outer lugs 12 being arranged opposite the intervals of the inner series of lugs. The lugs of the axle-nut are arranged in annular series and disposed transversely of the nut, and the latter is interlocked with the extension by first arranging its inner series of lugs in the spaces between the outer series of lugs of the extension or the outer ends or entrances of the bayonet grooves or ways and moving the nut inward on the extension of the spindle until the lugs 11 thereof contact with the inner series of lugs 6 of the extension 3. The nut is then partially rotated to carry the inner lugs 11 of the nut back of the outer series of lugs of the extension 3, and this also carries the outer lugs of the nut to the entrances or outer ends of the bayonet slots or ways, and the axle-nut is again partially rotated until the inner lugs of the nut strike the inner longitudinal flanges 9, which form stops.

The axle-nut is locked against rotation to prevent it from being accidentally jolted off the extension of the spindle by means of a hinged cap 13, arranged at the front or outer end of the axle-nut, provided at its top with perforated ears, and hinged to the top of the nut by a transverse fastening device 14, which passes through the perforated ears and through a perforated boss or lug 15 of the nut. The hinged cap is provided on its inner face with a vertically-disposed locking-flange 16 and a curved locking-lug 17, and the locking flange and lug 16 and 17 are adapted to enter the double bayonet-grooves of the extension 3 of the spindle and fill the spaces between the adjacent lugs. The bottom lug 17 is slightly curved to conform to the curved face of the adjacent portion of the extension of the spindle, and the locking-lug 16 has flat side faces, the axle-nut and the extension of the spindle being provided with flat adjacent faces to conform to the configuration of the lug 16. As the cover of the axle-nut is hinged at the top, it operates as a gravity-latch to hold the locking-lugs in engagement with the extension 3.

The axle-skein is provided at its inner end with the usual perforated lug 19 for the reception of a tie-rod for connecting the two skeins of an axle, but it will be readily apparent that the locking device may, if desired, be applied to an axle having solid or integral spindles.

It will be seen that the locking device for axle-skeins is exceedingly simple and inexpensive in construction, that it will permit an axle-nut to be readily and rapidly detached to enable a wheel to be removed, and that the axle-nut may be quickly replaced to lock a wheel on a spindle. It will also be apparent that the hinged cover of the axle-nut operates as a gravity-latch and that the axle-nut cannot possibly become accidentally disconnected from the extension of the spindle.

Changes in the form, proportion, and the minor details of construction may be resorted to without departing from the principle or sacrificing any of the advantages of this invention.

What I claim is—

In a device of the class described, the combination of a spindle having an extension 3 provided at one side with a flat face, the annular series of inner and outer lugs 6 and 7, disposed in pairs on the extension 3 and arranged transversely of the same, the outer lugs 7 being disposed opposite the intervals of the inner lugs 6, longitudinal flanges 8 connecting the adjacent ends of the inner and outer lugs 6 and 7, the longitudinal flanges 9 extending from the other ends of the inner lugs to the body portion of the spindle, said lugs 6 and 7 and flanges 8 and 9 forming double bayonet-grooves, the axle-nut having a flat face adjacent to a flat face of the extension 3 and provided with inner and outer series of lugs 11 and 12, alternately arranged and adapted to interlock with the lugs and flanges of the double bayonet-grooves to form a double lock, and the cover hinged at the top to the axle-nut and provided at one side with the vertical locking-flange 16 to fit in the space between the flat faces of the extension 3 and the nut, and having the curved locking-lugs 17 at its bottom, said locking flange and lugs 16 and 17 fitting in the entrance-opening of the double bayonet-grooves and filling the spaces between the adjacent lugs 7, substantially as described.

In testimony that I claim the foregoing as my own I have hereto affixed my signature in the presence of two witnesses.

CHARLES HENRY WORNNER RELYEA.

Witnesses:
J. M. WILLIAMS,
A. E. EYER.